United States Patent [19]

Carroll

[11] Patent Number: 4,711,223

[45] Date of Patent: * Dec. 8, 1987

[54] ALCOHOL FUEL CONVERSION APPARATUS

[76] Inventor: Bruce I. Carroll, 6137 Denton, Boise, Id. 83704

[*] Notice: The portion of the term of this patent subsequent to Jan. 13, 2004 has been disclaimed.

[21] Appl. No.: 897,791

[22] Filed: Aug. 18, 1986

Related U.S. Application Data

[63] Continuation-in-part of Ser. No. 297,215, Aug. 28, 1981, Pat. No. 4,635,608.

[51] Int. Cl.$^4$ ............................................. F02M 31/02
[52] U.S. Cl. .................................... 123/557; 123/575; 123/1 A
[58] Field of Search .............. 123/1 A, 525, 549, 552, 123/557, 575

[56] References Cited

U.S. PATENT DOCUMENTS

| | | | |
|---|---|---|---|
| 1,149,710 | 8/1915 | Beck | 123/557 |
| 1,237,862 | 8/1917 | Bintliff | 123/179 G |
| 1,319,718 | 10/1919 | Martin | 123/552 |
| 1,945,178 | 1/1934 | Carter | 123/552 |
| 3,447,511 | 6/1969 | Beard et al. | 123/557 |
| 3,762,378 | 10/1973 | Bitonti | 123/557 |
| 3,951,124 | 4/1976 | Fairbanks et al. | 123/557 |
| 3,986,486 | 10/1976 | Rabbiosi | 123/557 |
| 4,201,167 | 5/1980 | Bayley | 123/557 |
| 4,210,103 | 7/1980 | Dimitroff et al. | 123/1 A |
| 4,311,128 | 1/1982 | Bernecker | 123/558 |
| 4,323,046 | 4/1982 | Barber | 123/1 A |
| 4,342,287 | 8/1982 | Concepcion | 123/1 A |
| 4,366,782 | 1/1983 | Jackson et al. | 123/577 |
| 4,476,818 | 10/1984 | Yoon | 123/557 |

FOREIGN PATENT DOCUMENTS

| | | | |
|---|---|---|---|
| 2613175 | 10/1977 | Fed. Rep. of Germany | 123/557 |
| 2941169 | 4/1981 | Fed. Rep. of Germany | 123/1 A |
| 2058920 | 4/1981 | United Kingdom | 123/549 |

*Primary Examiner*—Craig R. Feinberg
*Assistant Examiner*—David A. Okonsky
*Attorney, Agent, or Firm*—Paul F. Horton

[57] ABSTRACT

Alcohol fuel conversion apparatus for internal combustion engines including a fuel tank, a fuel pump, a primary heat exchanger, a heat source, a converter and a carburetor or fuel injection system. The pump delivers pressurized liquid alcohol to the primary heat exchanger where the alcohol fuel is heated above the vaporization point at ambient pressure. The heated fuel is next delivered to the carburetor where the vaporized alcohol is metered and mixed with air for proper combustion and then delivered to the intake system of a conventional internal combustion engine, or, alternately, by means of the fuel injection system, the fuel is delivered directly to the cylinders where it is mixed with air for proper combustion. A fuel pre-heater assembly utilizing waste heat from the engine may also be provided.

12 Claims, 3 Drawing Figures

ALCOHOL FUEL CONVERSION APPARATUS

BACKGROUND OF THE INVENTION

1. Field of the Invention

This invention relates, in general, to apparatus for converting engines utilizing petroleum products as a fuel to engines utilizing alcohol, and methanol and ethanol, in particular, as a fuel.

2. Description of the Prior Art

The great usage of the traveling public of motorized vehicles equipped with internal combustion engines is well known. Equally well known and long recognized is the pollutant problem of the internal combustion engine when operated with conventional petroleum fuels. Pollution of the atmosphere, because of the exhaust discharge of carbon monoxide and nitrogen oxides, has been a cause of alarm in many of the world's larger cities and metropolitan areas. Many devices have been created and many techniques employed in attempting to reduce the pollutants of the petroleum fed internal combustion engines. Conversion units utilizing liquid petroleum gas, propane, have been somewhat successful in lowering pollution but have by no means eliminated the toxic substances produced by burning the petroleum fuels. Furthermore, many of the pollution reducing devices result in a decrease of the thermal efficiency of the engine.

Alcohols, and particularly methanol and ethanol, have received much attention as potential non-polluting fuels. Use of these fuels, however, have not been satisfactory largely because of low efficiency and poor starting characteristics when used with a cold engine. Several devices, such as those disclosed by Noguchi et al, U.S. Pat. No. 4,230,072 and Alm et al, U.S. Pat. No. 3,749,376 have attempted to utilize methanol as a secondary fuel to supplement the primary petroleum fuels to obtain greater efficiency. The petroleum pollution problem still remains, as does the dependence on oil. Oswald et al, U.S. Pat. No. 4,123,997, has sought to increase efficiency of the alcohols by a device which adjusts the advance of the fuel injection in cooperation with a controlled ignition device. Oswald, as do conventional non-vapor type carburetors, injects atomized droplets of the fuel in an air mixture to the intake ports of the engine.

SUMMARY OF THE INVENTION

The present invention comprises, generally, conversion apparatus for the operation of internal combustion engines on lower aliphatic alcohol such as methanol and ethanol. The conversion apparatus includes means for heating liquid alcohol, under pressure, to a temperature in excess of the vaporization temperature at ambient pressure; a converter for vaporizing the alcohol at reduced pressure; and a vapor-type carburetor for mixing the alcohol vapor with a selected proportion of air or injection of the alcohol vapor directly into the cylinders for mixture with air for proper combustion. A more definite description may be found in the appended claims.

The present invention proposes and has for objects, generally, the nearly complete combustion of alcohol as a fuel for a significant increase in efficiency; the concomitant reduction to near zero of exhaust pollutants; and the use of a readily producible non-petroleum fuel.

More specifically, the present invention proposes and has for objects the complete elimination of toxic hydrocarbons; the utilization of methanol and ethanol in conventional internal combustion engines; the use of high compression engines for high efficiency; and a conversion unit which provides rapid and dependable starting of a cold engine.

Additional objects and advantages will become apparent and a more thorough and comprehensive understanding may be had from the following description taken in conjunction with the accompanying drawings forming a part of this specification.

DETAILED DESCRIPTION OF THE DRAWINGS

DETAILED DESCRIPTION OF THE INVENTION

Figure 1:
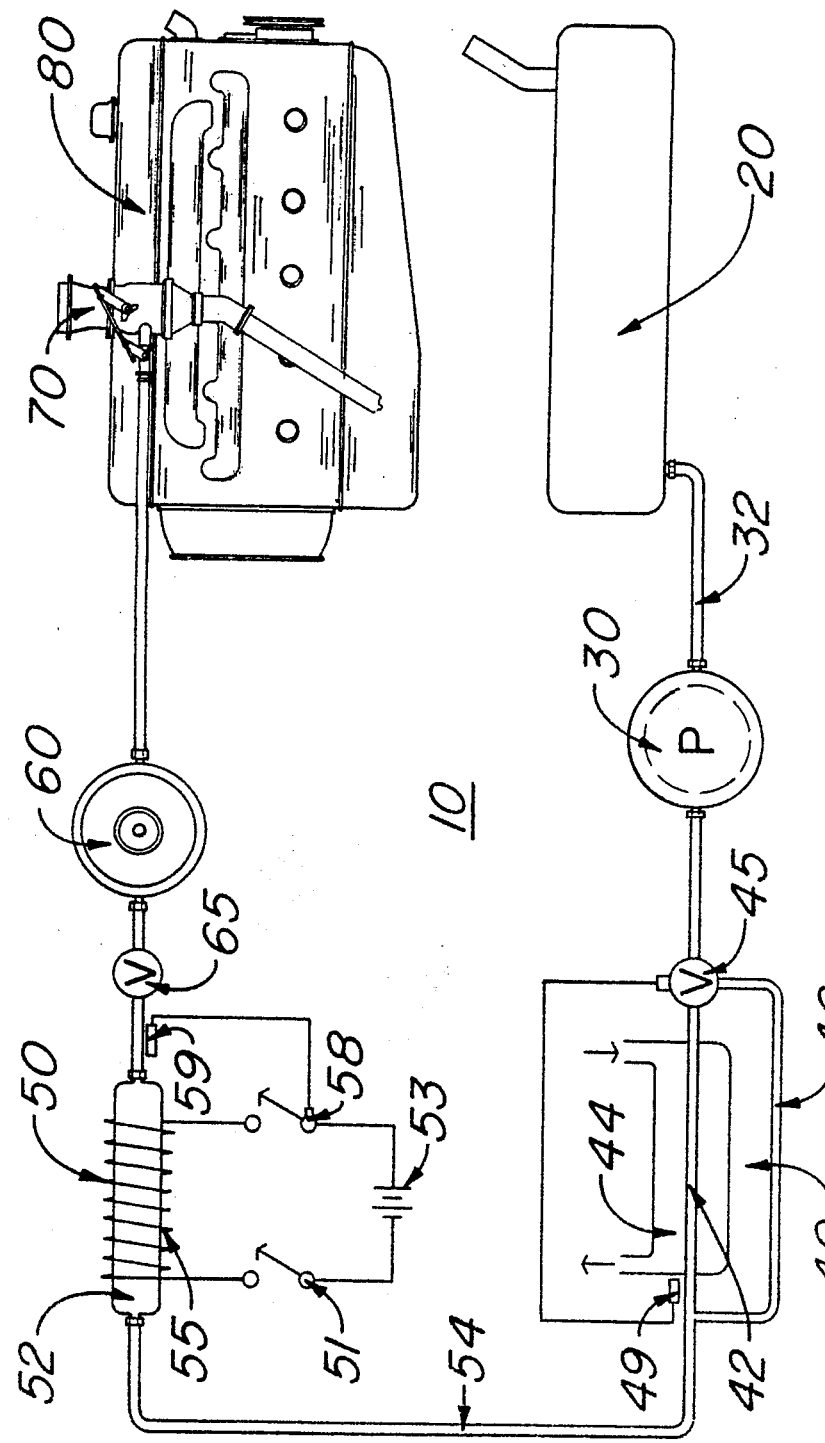
FIG. 1 is a schematic view of a preferred embodiment of the conversion apparatus of the present invention, showing use of a carburetor.

Referring now to FIG. 1, one embodiment to be preferred of alcohol fuel conversion apparatus 10 for internal combustion engines, made according to the present invention, is disclosed. Conversion unit 10 includes, generally, fuel storage tank 20, fuel pump 30, preheater assembly 40, primary heat exchanger 50, converter 60, and carburetor 70.

Figure 2:
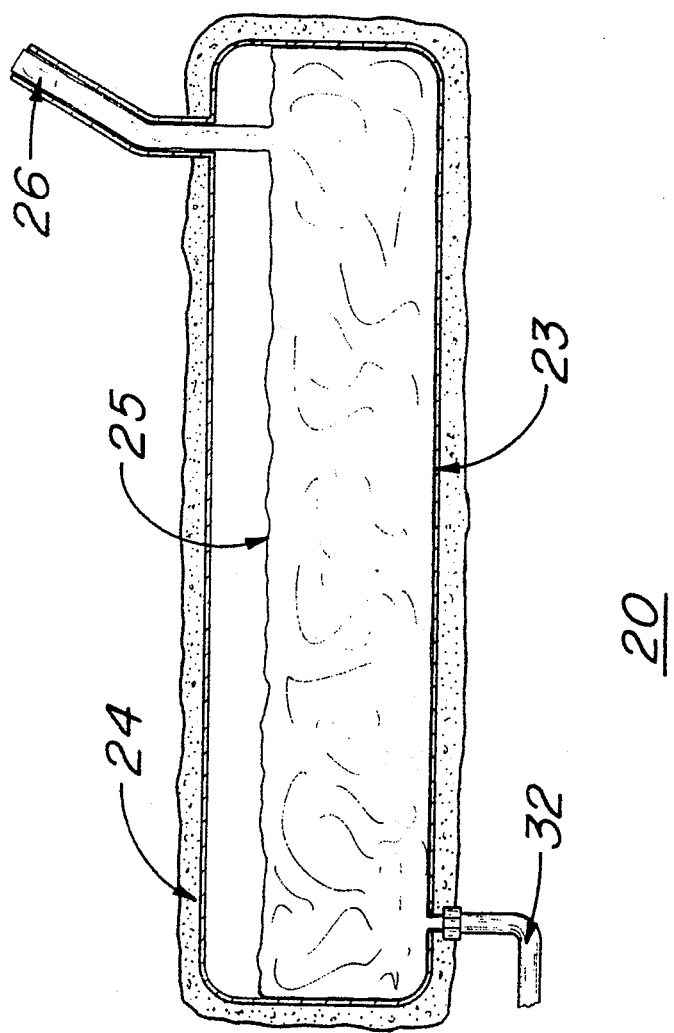
FIG. 2 is a sectional view of the preferred fuel tank of the present invention.

Fuel storage tank 20 may be conventional in design, however in climates where excessive evaporation due to heat absorbed by the tank is a problem, it is contemplated that the tank, as shown in FIG. 2, include an outer container 23 provided with an insulative cover 24 of polyurethane or the like and a fluid-tight liner or insert 25 located inside the container 23, collapsible upon emptying, manufactured of a material which is non-reactive to the alcohol fuel, provided with a fluid-tight closure 26 for filling.

Fuel storage means 20 is connected to and in fluid communication with pump 30 by means of appropriate conduit 32. Fuel pump 30 may be located at any appropriate place in the system, but is preferably located adjacent the outlet of the storage tank. The pump must be operable to maintain alcohol fuel in the liquid phase at a temperature in excess of the vaporization temperature of the alcohol at ambient pressure, prior to its injection into converter 60. A pump capable of maintaining pressures of 40–50 psi operated off the electrical system of a vehicle is suitable.

For increased thermal efficiency and to utilize waste heat from engine 80, a pre-heater assembly, designated generally by the numeral 40, is installed between pump 30 and primary heat exchanger 50. The pre-heater assembly includes a heat conductive conduit 42 in fluid communication with the primary heat exchanger and fuel storage tank through pump 30, and waste-heat delivery means 44 for delivering waste-heat from engine 80 to conduit 42 for heat transference thereto. Delivery means 44 in a water cooled engine may be a water hose for circulating water from and back to the cooling system as indicated by the arrows, or may be a direct heat-transferring metallic contact between conduit 42 and a heated portion of the engine, as for example the exhaust manifold. On an air-cooled engine, a direct metallic contact is preferred to the heating effect of air as a coolant.

Pre-heater assembly 40, in the preferred embodiment, also includes a shunt conduit 46 for the by-passing heat exchanger, conduit 42, and a control valve 45 for the directing fuel flow. Control valve 45 may be either manually or automatically operated anq also serves to check backflow of the fuel to pump 30. For automatic operation, the control valve is solenoid operated in its directive capacity and is activated by a temperature sensor 49 which monitors the temperature of the fuel in conduit 42.

The primary heat exchange means, designated by the numeral 50, is in fluid communication with fuel tank 20 through pump 30 and, where pre-heater assembly 40 is made part of the unit, is connected to the fuel outlet of the pre-heater as by conduit 54. It is understood that all conduits in the apparatus on the fuel storage side of converter 60 will be of the high pressure type for withstanding pump pressures and the additional pressure which may be caused by the heating of the fuel. The primary heat exchanger is preferably located as close as is physically possible to converter 60 for prevention of heat loss, and may be integral therewith. Primary heat exchanger 50 includes a low capacity conduit 52, made of copper or other highly conductive metal in heat transference contact with a resistive heating element such as a heating coil 55 providing the source of the heat. Switch 51 is used to activate the heating coil. It is imperative that the heat source provide and the heat exchanger accept sufficient heat to raise the temperature of fluid delivered by the heat exchanger to a temperature in excess of the vaporization temperature of the alcohol being used as fuel under ambient pressure. As an example, for use on a Volkswagen motor car, a device was constructed in which conduit 52 had a capacity of 25 ml and in which a resistive heating element drawing approximately 23 amperes current off a 12 volt system was employed. Vaporization temperature of ethyl alcohol was reached in less than one minute of time.

To prevent overheating of the alcohol fuel and possible breakdown of the fuel, a temperature sensing device 59 is used to control the temperature of heating element 55 as by an on-off switch 58. The temperature sensing device may be located in or adjacent to the outlet of conduit 52.

Converter 60 receives pressurized and heated fuel from the primary heat exchanger, preferably through a fuel lock valve 65 which permits fuel flow only when the ignition is turned on. The fuel lock valve may also serve as a pressure relief valve. The converter may include two or more stages of regulation to reduce fuel pressure in the vaporization of the alcohol fuel and may be in the nature of propane converters which are conventional in the art. Like propane converters, the converter may be equipped with a heat transfer system utilizing waste-heat from the engine. Unlike propane converters, the converter of the present invention may include a heat transfer system providing heat from the electrical system of a motorized vehicle.

Figure 3:
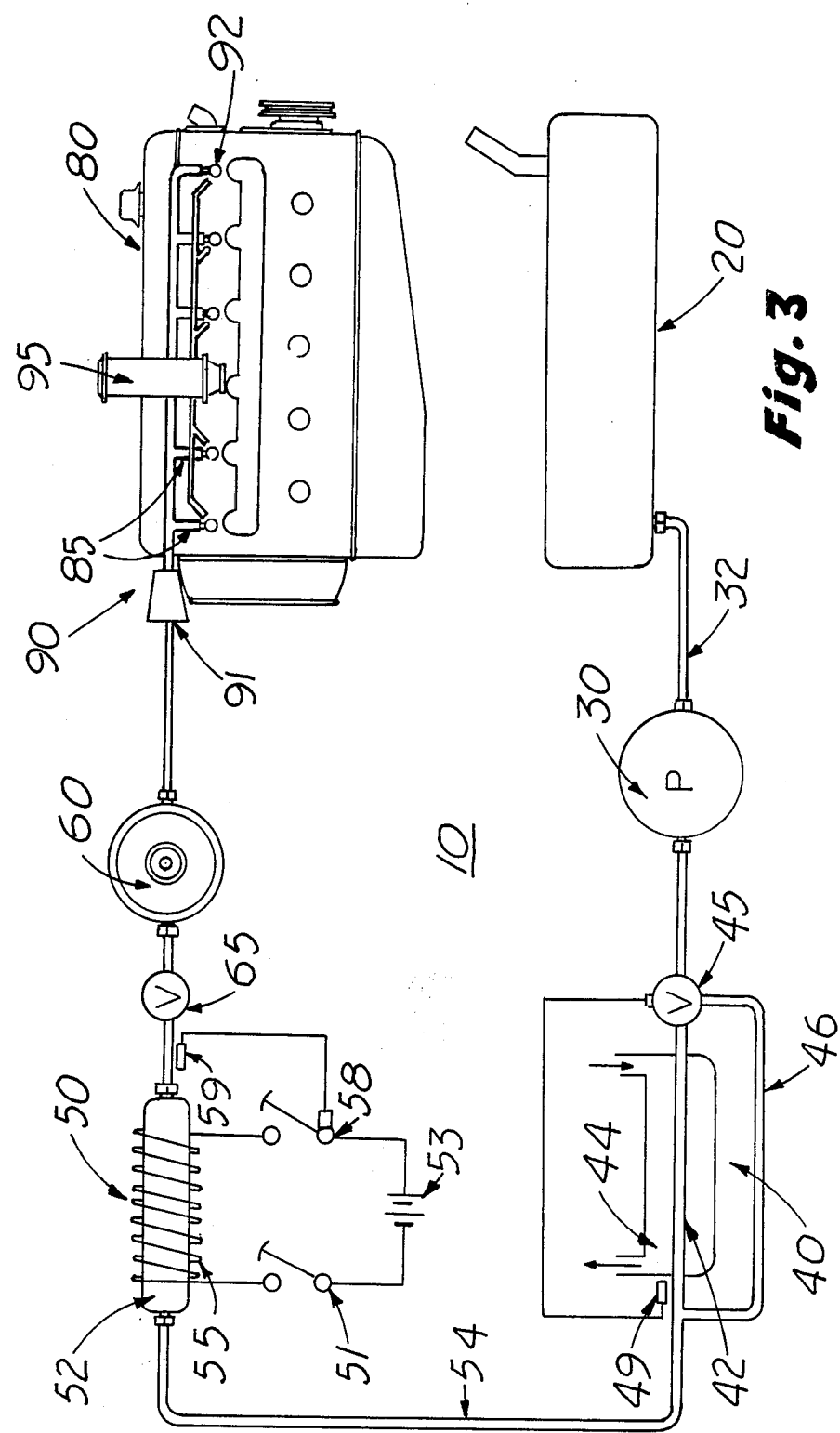
FIG. 3 is a schematic view of a second preferred embodiment of the conversion apparatus of the present invention showing use of a fuel injection system.

From the converter, alcohol vapor is fed directly to a vapor carburetor, as shown in FIG. 1, which may be identical in construction to the propane-type carburetor, or to fuel injection system 90, as shown in FIG. 3. In the use of a carburetor, FIG. 1, the alcohol vapors are combined with air, which may or may not be pre-heated to form a gaseous mixture, as opposed to an atomized mixture, proper for combustion purposes. It is contemplated that the gaseous mixture will allow a much leaner mixture of fuel than an atomized mixture resulting in cleaner burning of the fuel, substantially increased efficiency, and substantially decreased pollutants than combustion of an atomized mixture. The gaseous alcohol-air mixture is then delivered directly or by means of an intake manifold to the cylinders of the engine. The intake manifold is preferably well insulated to avoid condensation.

When using the fuel injection system 90, as shown in FIG. 3, alcohol vapor from converter 60 is fed to the cylinders preferably by means of separate fuel lines 85. In the cylinders, the alcohol vapors are combined with oxygen entering the cylinders, as by an air horn 95, for combustion. The fuel injection system of the present invention is conventional and may be either mechanically or electronically controlled. In a mechanically controlled system, as shown, a metering distributor 91 may be used to control amounts of vapor going to injector nozzles 92. In an electronically controlled system, not shown, vapor flow is controlled by electromagnetic valves controlled by sensors which measure engine speed, crankshaft position, throttle setting, amongst other functions.

In operation, assuming sufficient alcohol fuel in the system, and assuming use of a carburetor, as shown in FIG. 1, switch 51 is flipped to complete the electrical heating circuit between battery 53 and heating element 55. Heat from the element is transferred through conduit 52 to alcohol contained within the conduit raising the temperature of the alcohol in excess of the vaporization temperature of the alcohol at ambient pressure—for ethyl alcohol, somewhat in excess of 180° F. Temperature sensor 59, controlling on-off switch 58 prevents overheating of the alcohol. Sensor 59 may also be used for providing a temperature read-out on a control panel of a motorized vehicle.

Once fuel contained within conduit 52 of heat exchanger 50 has reached proper temperature, the ignition is turned on; fuel lock valve 65 opened; pump 30 activated; and fuel is pumped through conduit 42 of pre-heater 40 forcing the super-heated liquid alcohol from heat exchanger 50 into converter 60, where it is vaporized, and into carburetor 70 where a gaseous mixture of alcohol and air is formed for proper combustion. The mixture is then delivered to the cylinders of engine 80, still in gaseous form, where it is ignited to start the engine. Alcohol fuel is either directed through conduit 42 or through shunt conduit 46 of pre-heater assembly 40, depending upon temperatures sensed by sensor 49. In use of the fuel injection system 90, FIG. 3, the fuel is of course routed directly to the cylinders where it is mixed with air coming from air horn 95 for combustion.

Having thus described in detail a preferred selection of embodiments of the present invention, it is to be appreciated and will be apparent to those skilled in the art that many physical changes could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

I claim:

1. Alcohol fuel conversion apparatus for internal combustion engines comprising:
   fuel storage means for containing an alcohol fuel;
   primary heat exchange means in fluid communication with said fuel storage means for transferring heat to pressurized alcohol contained within said heat exchange means;
   a heat source for heating said primary heat exchange means;
   pressure relief valve means in closed fluid communication with said primary heat exchange means for releasing heated pressurized alcohol into an expansion chamber;
   converter means including said expansion chamber in fluid communication with said pressure relief valve means for receiving the heated pressurized alcohol and for the vaporization of the alcohol;
   fuel injection means in fluid communication with said converter means for injecting vaporized alcohol into the cylinders of an internal combustion engine for mixing with air within the cylinders for proper combustion; and
   pump means for pressurized pumping of alcohol from said 23 fuel storage means to said primary heat exchanger means, converter means, fuel injector means, and to the engine.

2. The apparatus as described in claim 1 wherein said heat source is an electrical resistance heater.

3. The apparatus as described in claim 2 wherein said electrical resistance heater is operable off the electrical system of a motorized vehicle.

4. The apparatus as described in claim 1 further comprising heater control means for controlling heat production from said source.

5. The apparatus as described in claim 4 wherein said heat control means includes means for sensing the temperature of alcohol and means for controlling heat production from said heat source dependent upon the temperature sensed by said sensing means.

6. The apparatus as described in claim 1 further comprising a pre-heater assembly for utilizing waste heat of the engine to pre-heat alcohol fuel, said assembly comprising a second heat exchanger in fluid communication with and between said fuel storage means and said primary heat exchange means and engine heat delivery means for conveying engine heat into heat transference contact with said second heat exchanger.

7. The apparatus as described in claim 6 wherein said pre-heater assembly further comprises a second heat sensor for sensing the temperature of alcohol flowing through said second heat exchanger; a shunt conduit by-pass for shunting alcohol around said second heat exchanger; and a shunt valve controlled by said second heat sensor, said shunt valve operable to provide alcohol flow through said second heat exchanger or through said shunt conduit dependent upon the temperature of the alcohol sensed by said second heat sensor.

8. Alcohol fuel conversion apparatus for internal combustion engines comprising:
   fuel storage means for containing an alcohol fuel;
   a primary heat exchanger in fluid communication with said fuel storage means;
   a heat source including an electrical resistance heat producing element in heat transference contact with said primary heat exchanger for heating pressurized liquid alcohol contained within said primary heat exchanger above the boiling point of the alcohol at ambient pressure;
   pressure relief valve means in closed fluid communication with said primary heat exchanger to release heated pressurized alcohol into an expansion chamber;
   a converter including said expansion chamber in fluid communication with said pressure relief valve means for converting the pressurized and heated liquid alcohol to a vapor;
   a fuel injector for receiving alcohol vapors from said converter and dispensing said vapors to the cylinders of an internal combustion engine for mixing with air within the cylinders for proper combustion; and
   a pump for pressurized delivery of alcohol from said fuel storage means through said primary heat exchanger to said converter and to said fuel injector.

9. The apparatus as described in claim 8 further comprising heat source control means for controlling heat output from said heat source.

10. The apparatus as described in claim 8 further comprising an alcohol pre-heater assembly located between said fuel storage means and said primary heat exchanger and in fluid communication with each for utilizing engine heat for the pre-heating of alcohol fuel.

11. The apparatus as described in claim 10 wherein said pre-heater assembly includes a second heat exchanger, a shunt conduit by-passing said second heat exchanger, and a shunt valve operable to selectively pass alcohol fuel through said shunt conduit and through said second heat exchanger.

12. The apparatus as described in claim 11 wherein said pre-heater assembly further comprises alcohol temperature sensing means operable to control said shunt valve.

* * * * *